United States Patent [19]

Ichikawa et al.

[11] Patent Number: 4,553,696
[45] Date of Patent: Nov. 19, 1985

[54] AIR CONDITIONING APPARATUS

[75] Inventors: Isamu Ichikawa, Kashiwa; Yutaka Fukushi, Sagamihara; Keiji Kamata, Yamato; Hikoshiro Suzuki, Sagamihara, all of Japan

[73] Assignee: Topre Corporation, Tokyo, Japan

[21] Appl. No.: 430,376

[22] Filed: Sep. 30, 1982

[30] Foreign Application Priority Data

Apr. 28, 1982 [JP] Japan .............................. 57-62520[U]

[51] Int. Cl.$^4$ ............................................. F24F 7/00
[52] U.S. Cl. ...................................... 236/49; 98/40.05
[58] Field of Search ............................ 98/40 D, 40.05; 137/486, 487.5; 236/49

[56] References Cited

U.S. PATENT DOCUMENTS 3,240,062   3/1966   Fredriksson ..................... 137/487.5
3,986,850  10/1976   Wilcox ................................ 98/40 D
4,406,397   9/1983   Kamata et al. ..................... 236/49 X

FOREIGN PATENT DOCUMENTS 5324726   7/1948   Japan .

Primary Examiner—William E. Wayner
Attorney, Agent, or Firm—Oblon, Fisher, Spivak, McClelland & Maier

[57] ABSTRACT

An air flow rate sensor and throttle valve which controls the opening of a duct in accordance with the detection signals from the air flow rate sensor are provided in a control duct between a supply chamber utilizing double ceilings and the air diffusers in the supply chamber. The quantities of air fed from the respective air diffusers can be equalized or can be set to the desired values. In this case, since the air blowing can be automatically controlled for each diffuser, it is not necessary to individually adjust the quantities of air for the respective air diffusers after the installation of the air conditioner, thereby eliminating the adjusting works of the air diffusers.

11 Claims, 9 Drawing Figures

F I G. 2
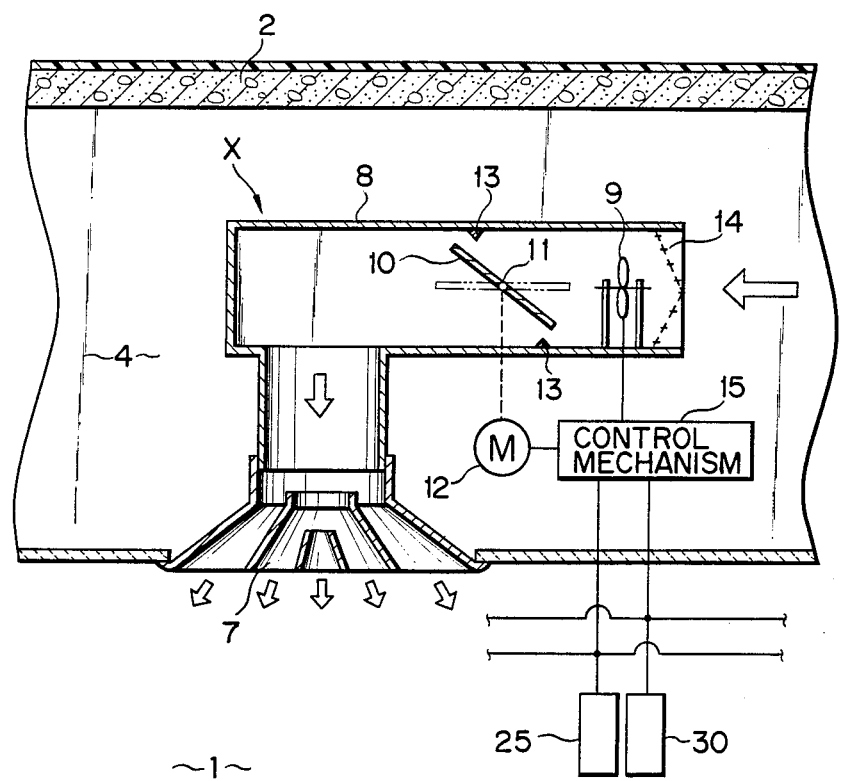

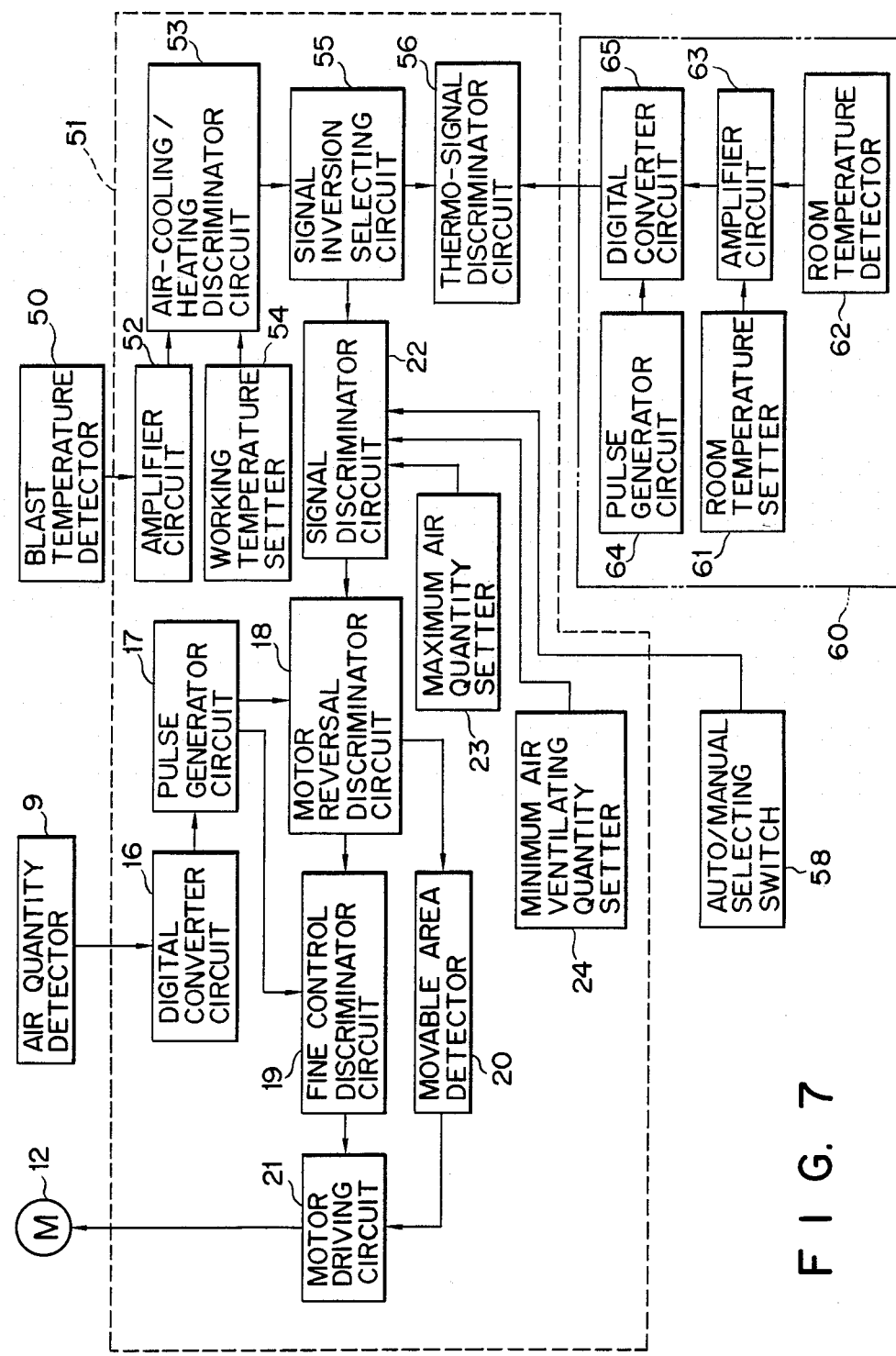
F I G. 7

AIR CONDITIONING APPARATUS

BACKGROUND OF THE INVENTION

The present invention relates to an air conditioning apparatus which utilizes a ceiling space defined by a double ceiling as a supply chamber.

A multi-storied building generally accommodates slabs used as the floors of upper stories and double ceilings constructed of ceiling boards lined on the lower surfaces of the slabs. In the space defined by the double ceilings have been arranged lights, alarms, electric cords for broadcasting, and ducts for an air conditioner. However, when ducts for coupling the air conditioner with air diffusers open at a ceiling board have been arranged in the ceiling space defined by the double ceilings, large expense and long construction times have been required to install the piping works of the ducts. When beams and girders are depended from the slabs, the ducts are passed through the lower portion of the beams. Therefore, this allows a wide space between the slabs and the ceiling boards, resulting in a tall building with relatively low ceiling heights in each room.

From the above-described reasons, it has been proposed not to arrange such ducts in the ceiling space defined between the slabs and the ceiling boards but to utilize the ceiling space directly as a supply chamber. For example, Japanese Patent Publication No. 24,726/1978 disclosed a technique for utilizing a ceiling space defined by double ceilings as a supply chamber.

The cool air delivered from an air conditioner is introduced into a supply chamber of the ceiling space, and is subsequently supplied to rooms through a plurality of air diffusers. In this case, the exhaust air pressure of the air diffuser in the vicinity of the air conditioner (on the upstream side) is higher than that of the air diffuser farther from the air conditioner (on the downstream side), so that the air distribution thus becomes unbalanced. Accordingly, the temperature distribution in the room may become unbalanced. In order to prevent such drawbacks, the above-mentioned patent announcement disclosed the installation of motor-driven blowers at the respective air diffusers. These blowers were controlled by a controller such as a variable voltage device for controlling the rotating speeds of the respective blowers, thereby equalizing the temperature distribution in the room.

However, a blower can generally vary the quantity of air emitted when the pressure on the upstream side of a propeller is varied, even if the rotating speed of the blower is maintained constant. In general, the air pressure in the vicinity of the air conditioner is higher than that farther from the air conditioner in the supply chamber. Thus, when the rotating speeds of the respective blowers are equal, the blowing quantities of the respective blowers become irregular. Therefore, it is necessary to control the rotating speeds of the respective blowers so as to obtain uniform temperature distribution in the room. However, when the blowing quantity of one blower is varied, the entire air pressure distribution in the supply chamber will vary. Accordingly, other blowers should likewise be controlled. In this manner, when the blowing quantities of all the blowers have been eventually equalized, all the blowers would be controlled in a plurality of stages, which would require an extremely complicated control mechanism.

SUMMARY OF THE INVENTION

It is an object of the present invention to provide an air conditioning apparatus which is capable of eliminating the aforementioned drawbacks of the conventional air conditioner and of obtaining a constant blowing quantity set in advance from each air diffuser even if there is different air pressure distribution in a supply chamber defined by a double ceiling and yet of eliminating the control works among the respective air diffusers.

According to an aspect of the present invention, there is provided an air conditioning apparatus comprising: a control duct provided in a supply chamber defined by a double ceiling to be opened at one end within the supply chamber and at the other end with an air diffuser, an air speed sensor provided at the upstream side of the control duct, and a throttle valve provided at the downstream side of said sensor for controlling the opening quantity of the control duct in accordance with a detection signal from the sensor. The air conditioning apparatus of the present invention advantageously arranges a self-control type constant blowing device having an air speed sensor and a throttle valve at each air diffuser.

BRIEF DESCRIPTION OF THE DRAWINGS

FIG. 2 is a front sectional view schematically showing a blowing quantity control unit extracted from the apparatus in FIG. 1;

FIG. 7 is a block diagram showing the control system of the controller;

DETAILED DESCRIPTION OF THE PREFERRED EMBODIMENTS

Figure 3:
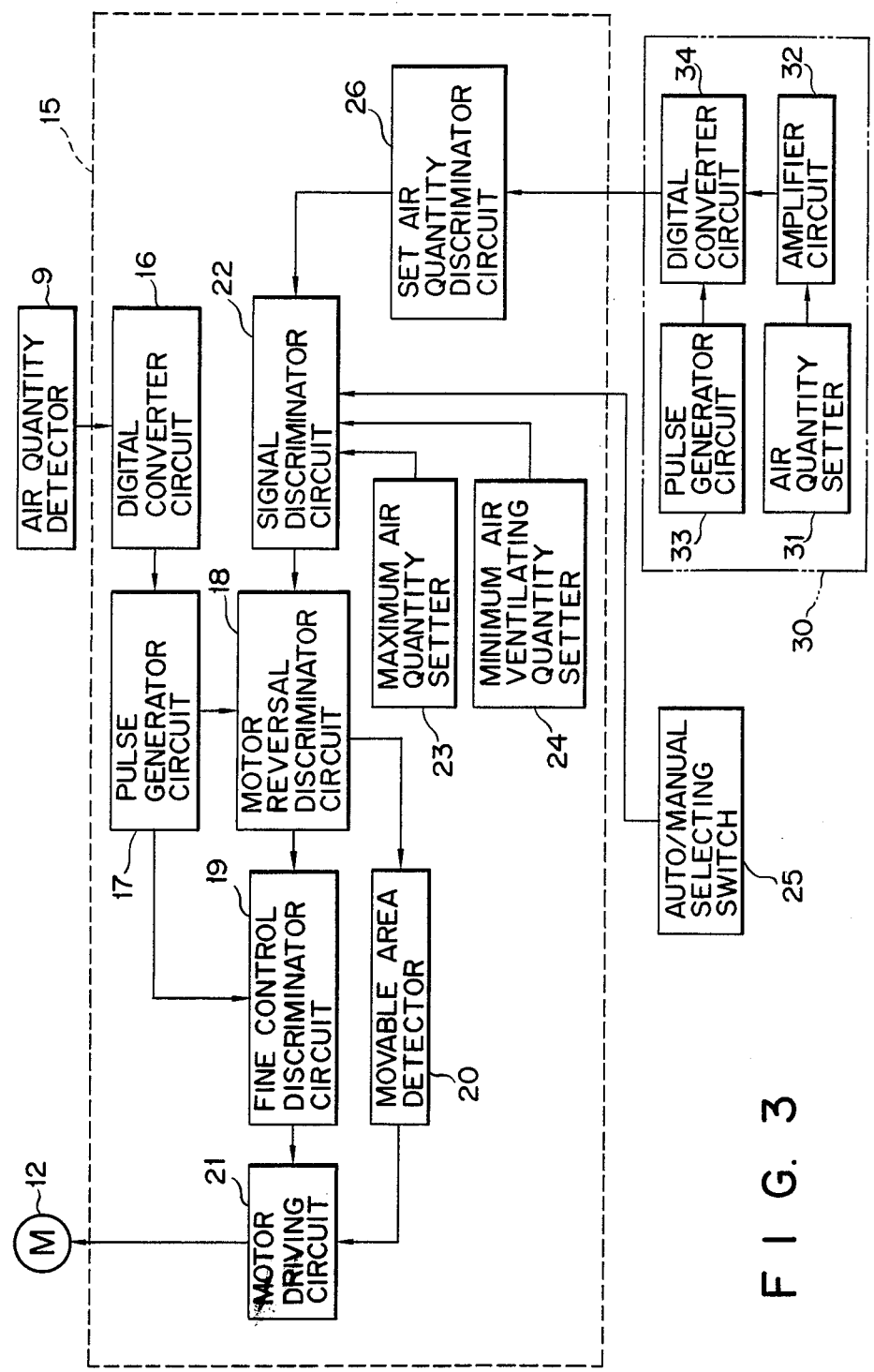
FIG. 3 is a block diagram showing the control system of the controller.

The first embodiment of an air conditioning apparatus according to the present invention will now be described in more detail with reference to the accompanying drawings, particularly to FIGS. 1 to 3.

Figure 1:
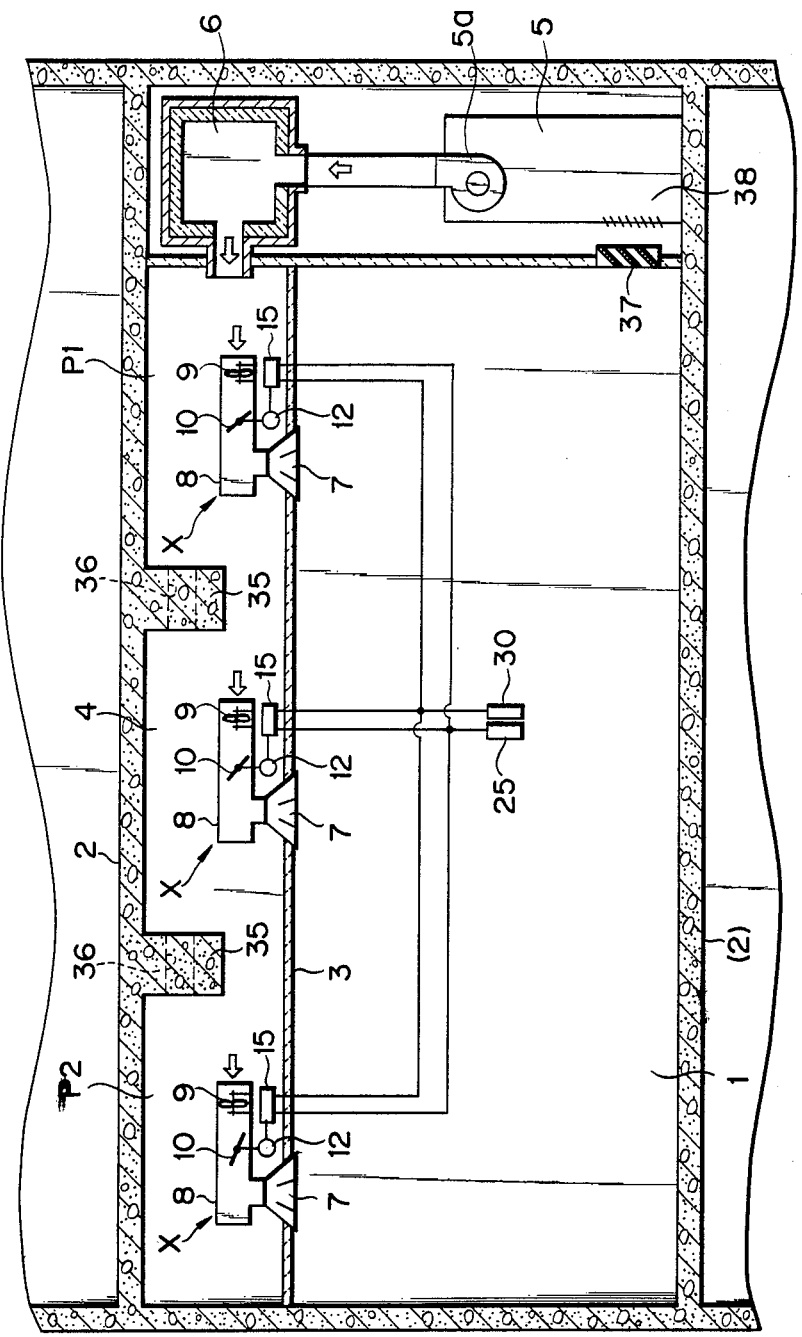
FIG. 1 is a front sectional view schematically showing a first embodiment of an air conditioning apparatus according to the present invention.

In FIG. 1, reference numeral 1 designates a room to be air conditioned. In the ceiling of the room 1, a double ceiling is constructed of a ceiling surface slab 2 becoming the floor of the next higher story and a ceiling board 3 arranged under the slab 2. The ceiling space formed between the ceiling surface slab 2 and the ceiling board 3 is defined as a supply chamber 4 of the air conditioning apparatus.

This air conditioning apparatus comprises an air conditioner 5. This air conditioner 5 supplies by a blower 5a air-conditioned air from the air conditioner 5 to the supply chamber 4 through a silencing chamber 6.

In the ceiling board 3, a plurality of air diffusers 7 which open into the room 1 are provided. Air quantity control units X are respectively provided in air diffusers 7 in the supply chamber 4. Each air quantity control unit X includes a control duct 8. Each control duct 8 is open at its one end to the supply chamber 4, and communicates at the other end with each air diffuser 7. Therefore, the conditioned air in the supply chamber 4 is blown via the ducts 8, through the corresponding diffusers 7, and into the room 1.

As shown in FIG. 2, an air flow rate sensor 9 is provided at the upstream side in each control duct 8. At the downstream of each sensor 9 is provided a throttle valve for variably controlling the area of the opening of the duct 8 such as, for example, a rotary plate valve 10 as a damper. A valve shaft 11 is secured to the center of each throttle valve 10. This valve shaft 11 is connected to each motor 12 as a drive unit. Each throttle valve 10 is rotated by each motor 12. Each throttle valve 10 fully opens each duct 8 when disposed in a horizontal attitude as shown by a two-dotted chain line, while each throttle valve 10 fully closes each duct 8 in the attitude that each valve 10 contacts at its both ends upper and lower stoppers 13. A filter 14 which is, for example, formed of a net, is provided at the inlet opening of the duct 8.

The air flow rate sensor 9 and the motor 12 provided in each control duct 8 are electrically connected to each control unit 15. In each control unit 15, an electric signal having air flow rate information from each sensor 9 is fed to a motor normal/reverse rotation discriminator 18 through a digital converter 16 for digitizing the air flow rate information into a digital signal and a pulse generator 17 for outputting a pulse responsive to the digital signal from the converter 16. A discrimination signal from the discriminator 18 is fed to a motor drive circuit 21 through a fine control zone discriminator 19 and a variable zone detector 20. The discriminator 18 is constructed to receive a signal from a signal discriminator 22, and this discriminator 22 is constructed to receive signals respectively from a maximum air quantity setter 23, a minimum ventilation air quantity setter 24, a manual changeover switch 25 which will be described later, and a set air quantity discriminator 26.

In this first embodiment, the switch 25 and an air quantity setter 30 installed in the room 1 are connected to each control unit 15 thus constructed. The switch 25 controls the quantity of the air by means of the air quantity setter 30 or stops the supply of the air (i.e., stops the air conditioning apparatus). The setter 30 sets by an air quantity setting actuator 31 the quantity of air required in the room 1. This setter 30 has an amplifier 32, a pulse generator 33 and a digital converter 34. The converter 34 is connected to each discriminator 26 in each control unit 15.

As shown in FIG. 1, beams 35 are provided on the ceiling surface slab 2. When the gaps between the ceiling board 3 and the beams 35 are small, a guide hole 36 may be opened in each beam 35. A return port 37 is provided at the portion of the side wall of the room 1 opposite to the air conditioner 5, and a suction port 38 is provided at the portion of the air conditioner 5 opposite to the return port 37.

The operation of the first embodiment thus constructed will now be described.

The air conditioned by the operation of the air conditioner 5 is supplied by the blower 5a into the supply chamber 4 through the silencing chamber 6. The air in the supply chamber 4 is fed via the respective ducts 8, through the corresponding air diffusers 7, and into the room 1.

When air conditioning is not required, the air conditioning apparatus is set by the switch 25 to stop supplying air. In this case, the discriminator 22 receives an air stop signal to maintain the throttle valve 10 in the fully closed attitude by the motor 12 through the discriminator 18, the detector 20, and the motor drive circuit 21.

When air conditioning is required, the switch 25 is set to the air quantity control state. Then, the desired air quantity is set by the actuator 31 of the setter 30. In the setter 30, a digital signal corresponding to the quantity of air set by the actuator 31 via the amplifier 32 and the generator 33 is generated from the converter 34. This digital signal from the setter 30 is fed to the discriminator 26 of the control unit 15. The discriminator 26 discriminates the set air quantity, and outputs a discrimination signal to the discriminator 22. A discrimination signal thus fed from the discriminator 22 is applied to the discriminator 18.

On the other hand, each sensor 9 detects the air intake flow rate (resulting in the quantity of the air) in each duct 8, and delivers the detection signal to the discriminator 18 through the converter 16 and the generator 17.

The discriminator 18 compares the present air quantity in the duct 8 detected by the sensor 9 with the required air quantity set by the setter 30, and delivers a signal to the motor drive circuit 21 based on the comparison. When the air quantity in the duct 8 is smaller than the required set air quantity, the motor drive circuit 21 rotates the motor 12 in one direction for opening the throttle valve 10, thereby increasing the quantity of the air dispensed from the diffuser 7 by increasing the degree of opening of the duct 8. When the motor 12 rotates in the other direction it closes the throttle valve 10, thereby reducing the quantity of the air dispensed from the diffuser 7.

Since the respective ducts 8 control the air quantity in accordance with the set air quantity designated by the corresponding control units 15, the quantity of the blown air among the respective ducts 8 can be equalized uniformly.

When there occurs a difference between the pressure $P_1$ at the position in the vicinity of the air conditioner 5 and the pressure $P_2$ at the position farther from the air conditioner 5 in the supply chamber 4, the valve 10 is automatically closed in the duct 8 of the position where the pressure is high, and the valve 10 is automatically opened in the duct 8 of the position where the pressure is low, thereby controlling the air pressure.

Therefore, even if a plurality of air diffusers 7 are provided, the quantity of air in the respective air diffusers 7 can be uniformly maintained and the quantity of air set by the setter 30 can be maintained. Accordingly, the air distribution in the room 1 can be equalized, and the temperature distribution in the room can also be equalized.

As apparent from the above description, since the quantity of air can be automatically controlled to the set air quantity by the respective control units 15 in the respective ducts 8, it is unnecessary to control the quantity of air between the respective ducts 8, and the air dispersion will not be affected by the influence of the pressure distribution in the supply chamber 4 at all.

In the air conditioning apparatus of the first embodiment, the quantities of air from all the ducts 8 are controlled and equalized via one manual switch 25 and the setter 30. However, the present invention is not limited to this particular embodiment. For example, as shown in the second embodiment in FIG. 4, the manual changeover switches 25 and the air quantity setters 30 may be respectively connected to the control units 15 in the respective ducts 8. With the construction thus provided, the air quantities can be individually controlled in the respective ducts 8. In the example of such utility, particularly when the interior space in the room 1 is divided into small chambers 41 via partition walls 40, the required air quantities can be set in the respective small chambers 41. In this case, even if the set air quantity is altered in a certain small chamber 41, it does not affect the air quantity of the other small chambers 41.

Figure 5:
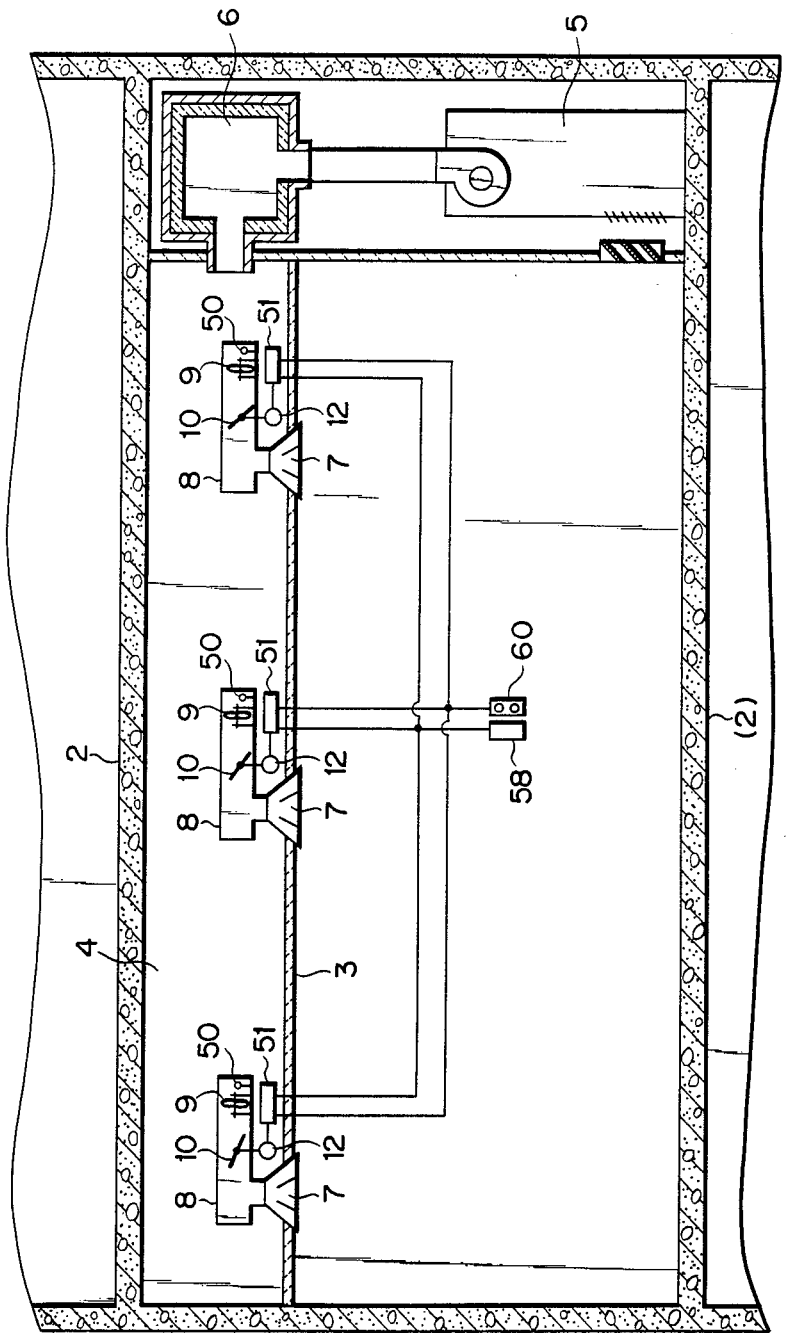
FIG. 5 is a front sectional view schematically showing a third embodiment of the air conditioning apparatus according to the present invention.
Figure 6:
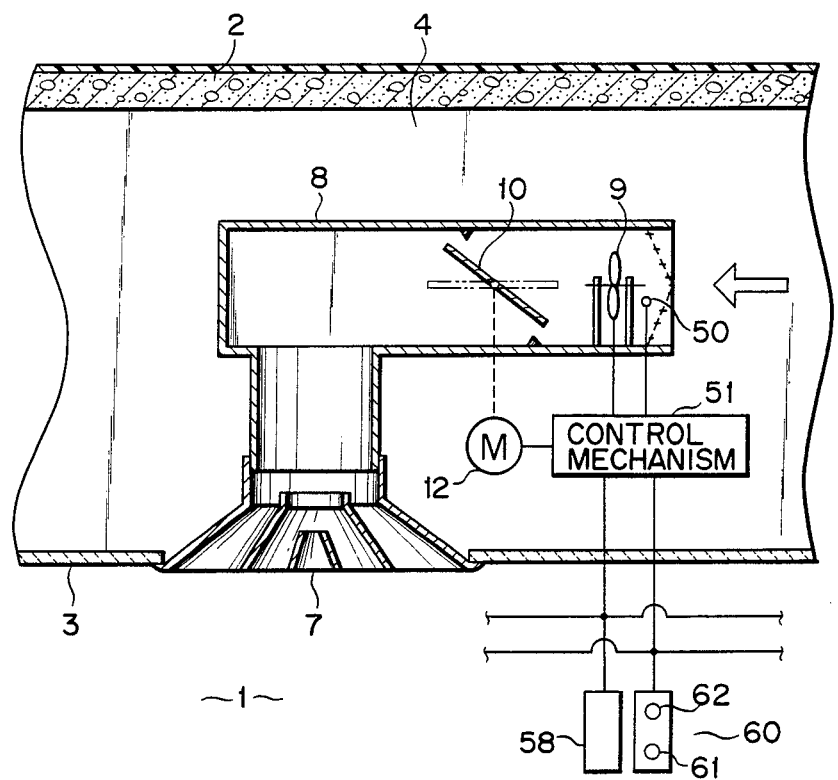
FIG. 6 is a front sectional view schematically showing a blowing quantity control unit extracted from the apparatus in FIG. 5.

The above-described first and second embodiments have been described with respect to constant air quantity control. However, the present invention is not limited only to this particular configuration. For example, as shown in the first embodiment in FIGS. 5 to 7, the present invention can perform constant temperature control. More particularly, in the third embodiment of the present invention, a blown-air temperature sensor 50 is, for example, provided at the upstream end of each duct 8. As shown in FIG. 7, the control unit 51 further comprises, in addition to the units in FIG. 3, an amplifier 52, a cooling/heating selector 53, a control temperature setter 54, a signal normal/reverse selector 55, and, instead of the discriminator 26 in FIG. 3, a thermo signal discriminator 56.

In the room 1 a manual changeover switch 58 and a room thermostat 60 are provided. The room thermostat 60 includes a room temperature setting actuator 61, a room temperature sensor 62, an amplifier 63, a pulse generator 64, and digital converter 65. The converter 65 is connected to a thermo signal discriminator 56 of the control unit 51.

In the third embodiment thus constructed, a desired room temperature can be set by the actuator 61 of the thermostat 60. The present room temperature is detected by the sensor 62, and the temperature of the air delivered from the supply chamber 4 to the respective ducts 8 is detected by the sensor 50. The motor 51 is controlled based on the difference between the room temperature and the temperature of the blown air, and the opening of the throttle valve 10 is likewise controlled. In other words, when the room temperature is, for example, lower than the set temperature during a heating operation, the throttle valve 10 is opened to blow the warm air in the supply chamber 4 into the room 1. On the other hand, when the room temperature is lower than the set temperature during a cooling operation, the valve 10 is closed to reduce the cooled air in the supply chamber 4 to the room 1. Since in particular this embodiment automatically controls the quantity of blown air by comparing the temperatures of the sensor 50, the actuator 61 and the sensor 62, the temperature required in the room 1 side can be precisely controlled, and the quantity of blown air can be controlled irrespective of the cooling and heating cycles.

Figure 4:
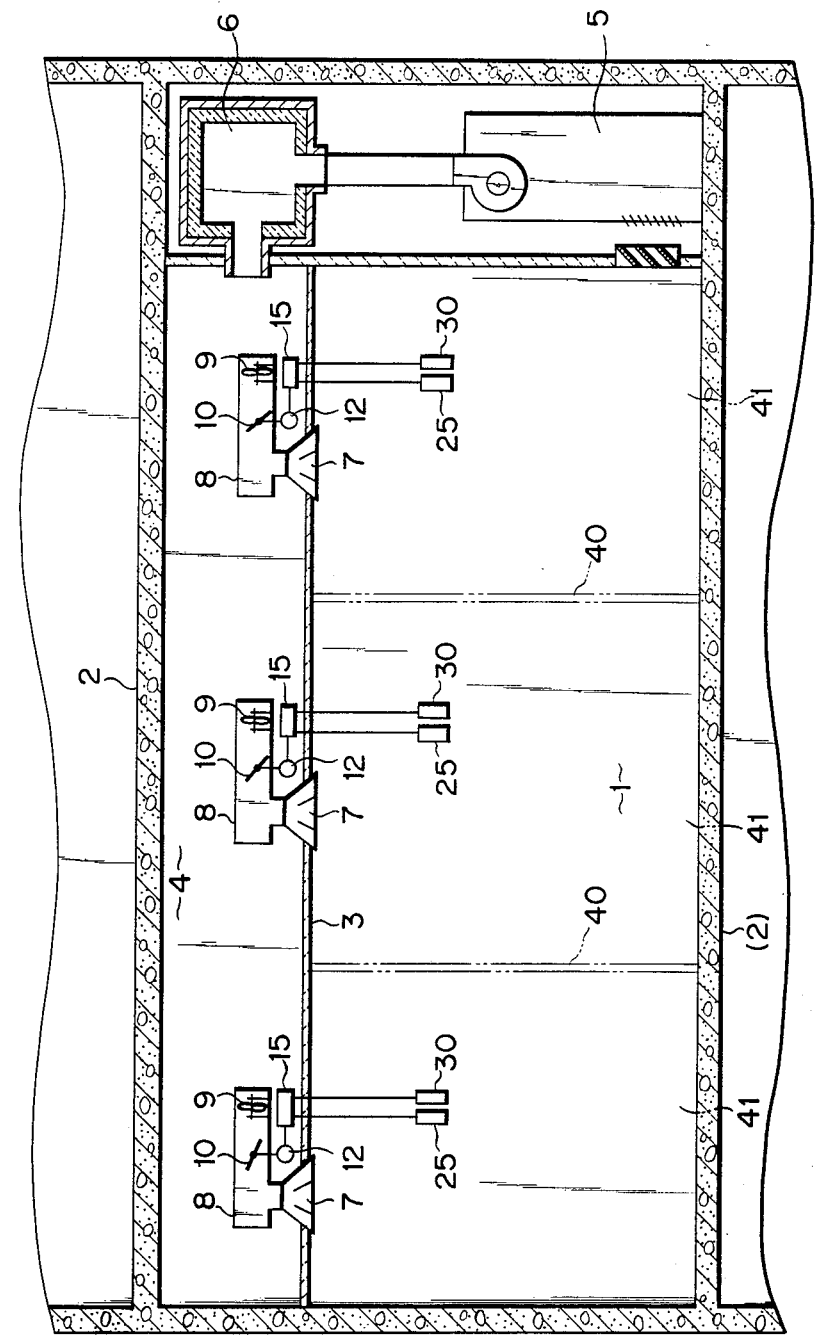
FIG. 4 is a front sectional view schematically showing a second embodiment of the air conditioning apparatus according to the present invention.

Even in the constant temperature control system as in the third embodiment of the present invention, the individual controls of the small rooms of the room 1 as shown in FIG. 4 can operated independently.

Figure 8:
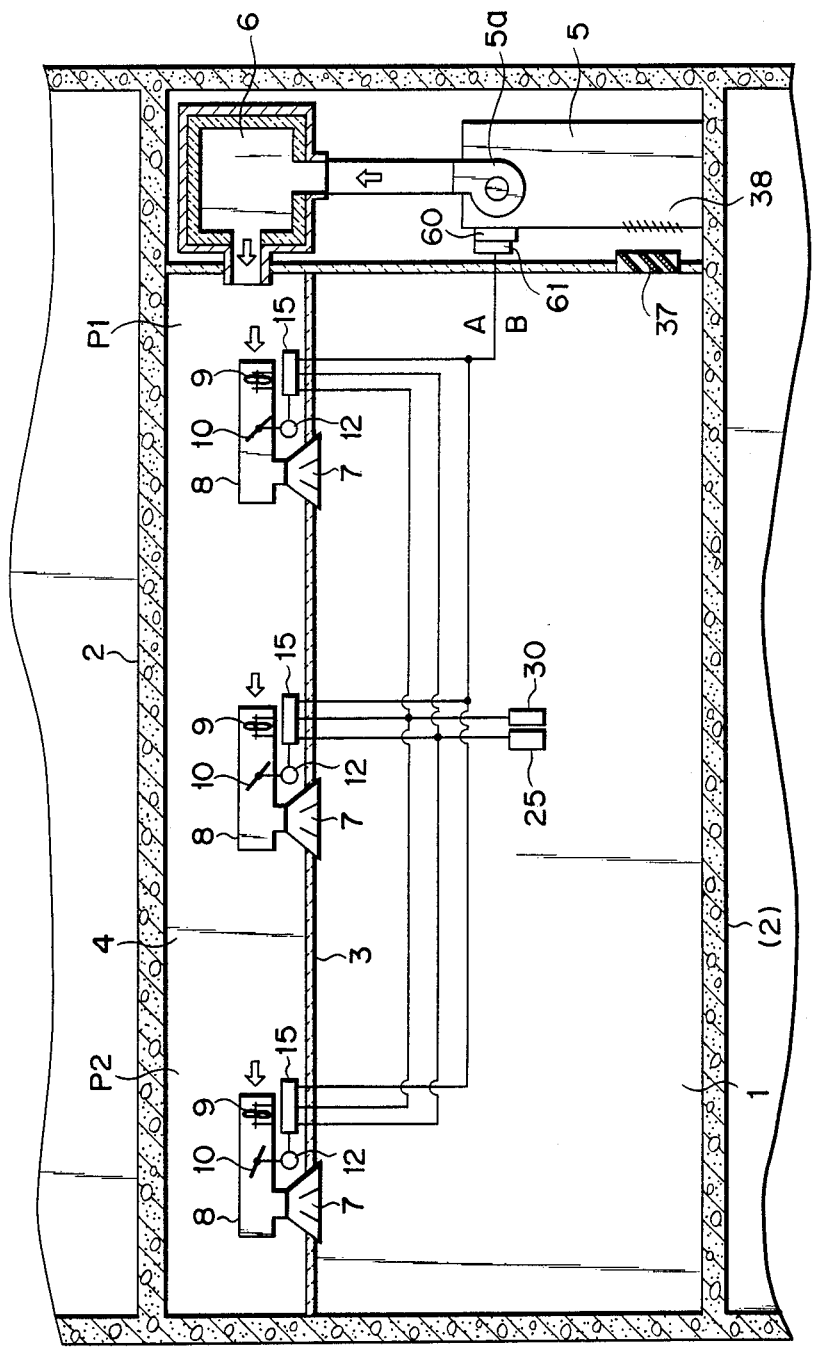
FIG. 8 is a front sectional view schematically showing a fourth embodiment of the air conditioning apparatus according to the present invention.
Figure 9:
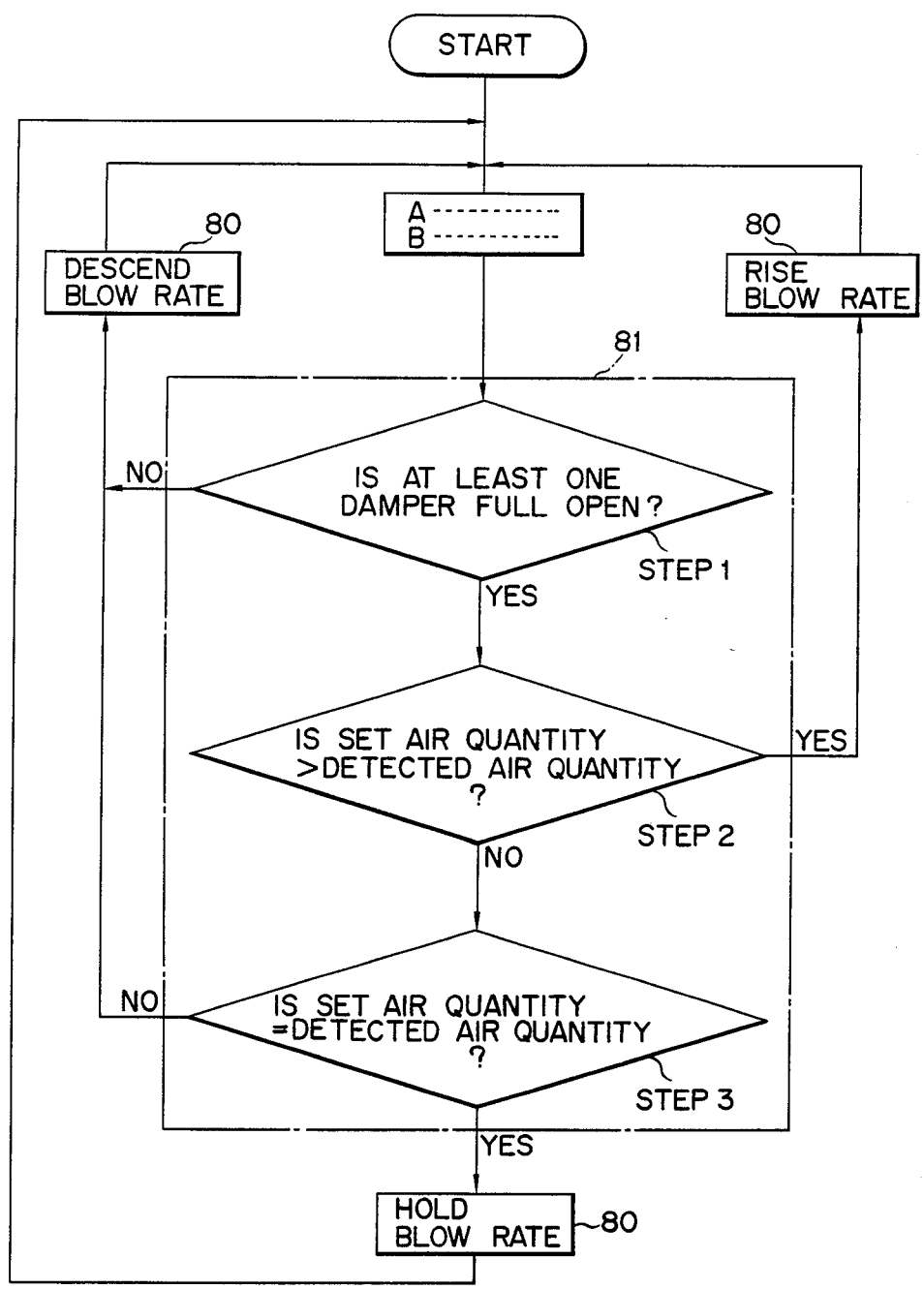
FIG. 9 is a flowchart showing the controlling content of the controller.

Further, the present invention can also be applied to the fourth embodiment in FIGS. 8 and 9. In other words, the fourth embodiment performs the energy-saving operation of the air conditioner 5. In this embodiment the blower 5a of the air conditioner 5 can be controlled. Since the blower 5a is driven by a motor, a frequency converter and hence an inverter 80 is provided to control the rotating speed of the motor in the air conditioner 5. The inverter 80 alters the frequency in accordance with a signal from a control signal generator 81. This generator 81 receives signals from the control units 15 of all the ducts 8. Each signal fed from the control 15 to the generator 81 has a signal A for notifying the generator 81 whether the throttle valve 10 is fully open or not, and a signal B is outputted from the discriminator 22. The generator 81 generates a control signal as shown in a flowchart in FIG. 9. In other words, it judges whether the valves 10 are fully open or not in more than one ducts 8 based on the signals A and B in STEP 1. When NO is judged in STEP 1, an instruction for decelerating the rotating speed of the blower 5a is delivered to the inverter 80. When YES is judged in STEP 1, it judges whether the actual quantity of air passed through the duct 8 is smaller than the set air quantity or not in more than one ducts 8 in STEP 2. When the actual air quantity is smaller than the set air quantity, an instruction for opening the throttle valve 10 is outputted from the control unit 15, and it accordingly detects this instruction signal. When YES is judged in STEP 2, an instruction signal for accelerating the rotating speed of the blower 5a is delivered to the inverter 80. When NO is judged in STEP 2, it continues to STEP 3. In STEP 3, it judges whether the actual air quantity is equal to the set air quantity or not in more than one ducts 8. When YES is judged in STEP 3, an instruction signal for maintaining the rotating speed of the blower 5a at the present state is delivered to the inverter 80. When NO is judged in STEP 3, an instruction signal for decelerating the rotating speed of the blower 5a is delivered to the inverter 80.

Therefore, since an excessive quantity of air is delivered from the air conditioner 5 when the valves 10 in all the ducts 8 are not fully open according to the above-described construction, the rotating speed of the blower 5a is decelerated to prevent wasted energy, and the air conditioner 5 is operated with the required minimum air quantity. When the throttle valve 10 of any one duct 8 is fully open, its blowing condition is directed to be deteriorated to the worst state. Accordingly, the rotating speed of the blower 5a is controlled with this blowing condition as a reference. In this manner, the energy-saving operation of the air conditioner 5 can be performed. In addition, since the pressure in the supply chamber 4 can be maintained at the minimum, the air quantity leaked from the supply chamber 4 can be reduced.

According to the present invention as described above, the air flow rate sensor and the throttle valve which controls the opening of the duct in accordance with the detection signals from the air flow rate sensor are provided in the control duct between the supply chamber utilizing the double ceilings and the air diffusers in the supply chamber. Therefore, the quantities of air fed from the respective air diffusers can be equalized or can be set to the desired values. In this case, since the air blowing can be automatically controlled for each diffuser, it is not necessary to individually adjust the quantities of air for the respective air diffusers after the installation of the air conditioner, thereby eliminating the adjusting works of the air diffusers.

What we claim is:

1. An air conditioning apparatus comprising:

a ceiling board for defining the ceiling of a room to be air conditioned;

a slab provided in a predetermined space above said ceiling board, said ceiling board and said slab forming a double ceiling structure, the space between said ceiling board and said slab defining a supply chamber;

air conditioning means for conditioning air passing therethrough;

communicating means provided in said ceiling board for communicating said supply chamber with said room, said communicating means having a plurality of through holes formed at said ceiling board;

circulating means for passing the air in said room through said air conditioning means and returning the air in the room through said supply chamber into the room through said plurality of through holes;

ducts provided corresponding to the respective through holes in said supply chamber, each connected at one end thereof to the corresponding through holes and at the other end thereof into said supply chamber;

air quantity detecting means provided in said respective ducts for detecting the air quantity in the respective ducts;

throttle means provided at the downstream side of said air quantity detecting means and movably supported to vary the opening extent of said ducts for adjusting the air quantity of the air flowing through the ducts;

drive means connected to said respective throttle means for driving said throttle means;

a plurality of control means each connected to a respective one of said drive means for driving said drive means based on detected air quantity by said air quantity detecting means so that the corresponding throttle means having controlled apertures in their respective ducts; and a first setter provided in said room and connected to the respective control means for setting the air quantities in the respective ducts to desired values.

2. The air conditioning apparatus according to claim 1, wherein said each control means compares the air quantity detected by the air quantity detecting means in each duct with the air quantity set by the first setter and controlling the drive of the driving means so that the detected air quantity coincides with the set air quantity.

3. The air conditioning apparatus according to claim 1, which further comprises:

a plurality of partition plates for dividing said room into a plurality of small chambers for the respective through holes.

4. The air conditioning apparatus according to claim 3, which further comprises:

first setters provided in the respective small chambers and connected to the corresponding control means for setting the air quantities in the respective ducts to desired values.

5. The air conditioning apparatus according to claim 4, wherein said each control means compares the air quantity detected by the air quantity detecting means in the corresponding duct with the air quantity set by the corresponding first setter, and controlling the drive of the corresponding driving means so that the detected air quantity coincides with the set air quantity in every small chamber.

6. The air conditioning apparatus according to claim 1, which further comprises:

a room thermostat disposed in the zone to be air-conditioned so as to control the room temperature of the zone and generate a thermo signal; and a thermo signal discriminating means for receiving the thermo signal from said room thermostat to regulate the quantity of air;

wherein said control means has a signal discriminating means for producing a signal corresponding to a required air quantity in proportion to the thermo signal from said room thermostat, the required air quantity being below the air quantity set by said air quantity setter as a maximum air quantity, and said control means controls said driving means to make the necessary air quantity coincide with the detected air quantity.

7. The air conditioning apparatus according to claim 6, wherein said control means includes a blast temperature detector disposed in an air stream in said duct member to measure a temperature of the air stream, and a working temperature setter for setting a changeover temperature of cooling and heating modes of the air quantity regulating apparatus.

8. The air conditioning apparatus according to claim 7, which further comprises:

a plurality of partition plates for dividing said room into a plurality of small chambers for the respective through holes.

9. The air conditioning apparatus according to claim 8, which further comprises:

blown-air temperature detecting means provided in the respective ducts and connected to the corresponding control means for detecting the blown-air temperatures in the respective ducts to transmit the detected blown-air temperatures to the corresponding control means;

room temperature detecting means provided in the respective small chambers and connected to the corresponding control means for detecting the temperatures in the respective small chambers to transmit the detected room temperatures to the corresponding control means; and a plurality of second setters provided in the respective small chambers and connected to the corresponding control means for setting the desired temperatures in the respective small chambers.

10. The air conditioning apparatus according to claim 9, wherein said respective control means compare the respective blown-air temperatures detected by the corresponding blown-air temperature detecting means, and the room temperatures of the corresponding small chambers detected by the room temperature detecting means with the set temperature set by said second setter to control the drive of the drive means so that the room temperatures of the corresponding small chambers coincide with the set temperature.

11. An air conditioning apparatus comprising:

a ceiling board for defining the ceiling of a room to be air conditioned;

a slab provided at a predetermined space from said ceiling board above said ceiling board, said ceiling board and said slab forming a double ceiling structure, the space between said ceiling board and said slab defining a supply chamber;

communicating means provided in said ceiling board for communicating said supply chamber with said room, said communicating means having a plurality of through holes formed at the ceiling board;

an air conditioning means which includes a heat exchanger and a blower for blowing air, heat of which is exchanged in said heat exchanger;

a terminal air quantity control unit which is installed in said supply chamber to communicate with each through hole and which controls the quantity of air which is distributed to the room through the supply chamber, said each terminal air quantity control unit including ducts provided correspondingly to the respective through holes in said supply chamber, and connected at one end thereof to the corresponding through holes and opened at the other end with said supply chamber, and an air quantity sensor which detects a flow rate of the air which passes through said duct, a damper which is disposed in said duct and which is movable between a first position to allow air flow and a second position to interrupt the air flow, a drive mechanism which drives said damper, a setter which is disposed in the room and which sets the quantity of the air which is distributed to the room and a unit controller which controls said drive mechanism in order to match the quantity of the air which actually passes with the quantity of air which is set, based on the air quantity detected by said air quantity sensor and the air quantity at said setter; and an air quantity control device, attached to said air conditioner, which controls said blower to reduce the blown air quantity until at least one of said dampers reaches first position when all of said dampers are not in the first position, which controls said blower to decrease the blown air quantity when the air quantity detected by said air quantity sensor is smaller than the air quantity set by said setter while at least one of said dampers is located in the first position, and which controls said blower to maintain the blown air quantity when the air quantity detected by said air quantity sensor is equal to the air quantity set by said setter.

* * * * *